United States Patent
Knudsen

(10) Patent No.: US 9,706,315 B2
(45) Date of Patent: Jul. 11, 2017

(54) TRANSCEIVER FOR A HEARING AID AND A METHOD FOR OPERATING SUCH A TRANSCEIVER

(71) Applicant: WIDEX A/S, Lynge (DK)

(72) Inventor: Niels Ole Knudsen, Humlebak (DK)

(73) Assignee: WIDEX A/S, Lynge (DK)

( * ) Notice: Subject to any disclaimer, the term of this patent is extended or adjusted under 35 U.S.C. 154(b) by 27 days.

(21) Appl. No.: 14/792,739

(22) Filed: Jul. 7, 2015

(65) Prior Publication Data
US 2015/0312684 A1    Oct. 29, 2015

Related U.S. Application Data

(63) Continuation-in-part of application No. PCT/EP2013/052411, filed on Feb. 7, 2013.

(51) Int. Cl.
*H04R 5/00*    (2006.01)
*H04R 25/00*    (2006.01)
(Continued)

(52) U.S. Cl.
CPC ......... *H04R 25/552* (2013.01); *H04B 5/0075* (2013.01); *H04L 25/03343* (2013.01);
(Continued)

(58) Field of Classification Search
CPC   H04R 25/552; H04R 25/554; H04R 2225/51; H04R 2460/03; H04R 2205/041;
(Continued)

(56) References Cited

U.S. PATENT DOCUMENTS

| 2,653,243 A | 9/1953 | McClellan |
| 4,529,941 A | 7/1985 | Lipoff |
| (Continued) |

FOREIGN PATENT DOCUMENTS

| CN | 1250246 A | 4/2000 |
| EP | 0663724 A2 | 7/1995 |
| (Continued) |

OTHER PUBLICATIONS

International Search Report and Written Opinion, issued in corresponding International Application No. PCT/EP2013/052411, mailed Oct. 28, 2013, 11 pages in English.
(Continued)

*Primary Examiner* — Andrew L Sniezek
(74) *Attorney, Agent, or Firm* — Sughrue Mion, PLLC

(57) ABSTRACT

A frequency-shift-keying (FSK) transceiver for use in a hearing aid system and having a resonant circuit including a transceiver inductance (L1), the resonant circuit having a resonance frequency, and a transfer function where gain and phase are frequency dependent, wherein the transceiver includes an FSK modulator receiving a data stream, and in response thereto outputting an FSK modulated signal to the resonant circuit for wireless transmission. The transceiver includes a controller monitoring the data stream received by the FSK modulator, and a phase equalizer unit controlled by the controller for substantially equalizing the phase distortion introduced by the frequency dependent resonant circuit. The invention also provides a hearing aid and a method of operating an FSK transceiver.

15 Claims, 5 Drawing Sheets

(51) Int. Cl.
*H04B 5/00* (2006.01)
*H04L 25/03* (2006.01)
*H04L 27/12* (2006.01)
*H04L 27/01* (2006.01)
*H04L 27/156* (2006.01)

(52) U.S. Cl.
CPC .............. *H04L 27/01* (2013.01); *H04L 27/12* (2013.01); *H04L 27/156* (2013.01); *H04R 25/554* (2013.01)

(58) Field of Classification Search
CPC .............. H04R 2225/55; H04B 5/0075; H04L 25/03343; H04L 27/01; H04L 27/12; H04L 27/156
See application file for complete search history.

(56) References Cited

U.S. PATENT DOCUMENTS

| | | | |
|---|---|---|---|
| 4,987,374 | A | 1/1991 | Burke |
| 5,231,355 | A | 7/1993 | Rider et al. |
| 5,450,086 | A | 9/1995 | Kaiser |
| 5,561,398 | A | 10/1996 | Rasmussen |
| 6,229,402 | B1 | 5/2001 | Kataoka et al. |
| 2005/0105653 | A1 | 5/2005 | Mizuno |
| 2007/0290930 | A1 | 12/2007 | Krishnaswamy et al. |
| 2011/0111706 | A1 | 5/2011 | Noel |
| 2011/0222621 | A1 | 9/2011 | Christensen et al. |
| 2012/0045023 | A1 | 2/2012 | Casagrande |
| 2012/0194369 | A1 | 8/2012 | Galton et al. |
| 2012/0300870 | A1* | 11/2012 | Dickey .................. H04L 27/12 375/295 |
| 2015/0124976 | A1* | 5/2015 | Pedersen .............. H04R 25/552 381/23.1 |

FOREIGN PATENT DOCUMENTS

| | | |
|---|---|---|
| EP | 1267491 A2 | 12/2002 |
| EP | 1428412 A1 | 6/2004 |
| EP | 2171860 A1 | 4/2010 |
| JP | 2006033584 A | 2/2006 |
| JP | 2006-333143 A | 12/2006 |
| WO | 03/026348 A1 | 3/2003 |
| WO | 2006045346 A1 | 5/2006 |
| WO | 2009/001234 A1 | 12/2008 |
| WO | 2009062500 A1 | 5/2009 |
| WO | 2010058324 A2 | 5/2010 |
| WO | 2013075758 A1 | 5/2013 |

OTHER PUBLICATIONS

Communication dated Jul. 8, 2016 from the Korean Patent Office in counterpart Application No. 10-2015-7021693.
Communication dated Apr. 21, 2016 from the Chinese Patent Office in counterpart Application No. 2013800690570.

* cited by examiner

Ideal signal
Compensated signal

Ideal signal
Compensated signal

… (1)

TRANSCEIVER FOR A HEARING AID AND A METHOD FOR OPERATING SUCH A TRANSCEIVER

RELATED APPLICATIONS

The present application is a continuation-in-part of application No. PCT/EP2013/052411, filed on Feb. 7, 2013, in Europe and published as WO2014121837 A1.

FIELD OF THE INVENTION

The present invention relates to hearing aids. The invention more particularly, relates to a hearing aid having a transceiver for communication with other devices, such as another hearing aid or an external device, for controlling, streaming audio to or fitting the hearing aid. The invention further relates to a frequency-shift-keying (FSK) transceiver for a hearing aid system. The invention also relates to a method of operating an FSK transceiver.

BACKGROUND OF THE INVENTION

Modern, digital hearing aids comprise sophisticated and complex signal processing units for processing and amplifying sound according to a prescription aimed at alleviating a hearing loss for a hearing impaired individual. Furthermore, connectivity is an important issue for modern digital hearing aids. Advanced binaural hearing aids are interconnected and may share audio picked up in the respective hearing aids. When sharing audio, the complex algorithms in the signal processors of the hearing aids are e.g. able to identify the direction of an audio source and to suppress noise from the environment. Hereby, the hearing aid user will experience that it is easier to hear sounds from all directions, to find out from which direction a sound is coming and to concentrate on that sound whilst being able to ignore the other sounds or noise, to understand speech in noisy surroundings. Finally hearing aids protect the brain from auditory deprivation where the brains ability to discriminate sounds decreases when not stimulated.

In order to further improve the hearing aid user experience; there is a need for increasing the amount of data that can be exchanged between a set of binaural hearings aids. The purpose of the invention is to increase the amount of data that can be transmitted from a hearing aid.

SUMMARY OF THE INVENTION

This purpose is achieved by a frequency-shift-keying (FSK) transceiver having a resonant circuit comprising a transceiver inductance ($L_1$). The resonant circuit has a resonance frequency, $F_R$, and a transfer function where gain and phase are frequency dependent. The transceiver comprises an FSK modulator receiving a data stream and, in response thereto, outputting an FSK modulated signal to the resonant circuit for wireless transmission. The transceiver includes a controller monitoring the data stream received by the FSK modulator; and a phase equalizer unit controlled by the controller for applying a phase correction to the FSK modulated signal for substantially equalizing the phase distortion introduced by the frequency dependent resonant circuit.

According to a second aspect of the invention, there is provided a hearing aid having a frequency-shift-keying (FSK) transceiver with a resonant circuit comprising a transceiver inductance ($L_1$). The resonant circuit has a resonance frequency, $F_R$, and a transfer function where gain and phase are frequency dependent, wherein the transceiver comprises an FSK modulator receiving a data stream and, in response thereto, outputting an FSK modulated signal to the resonant circuit for wireless transmission. The transceiver further includes a controller monitoring the data stream received by the FSK modulator; and a phase equalizer unit controlled by the controller for applying a phase correction to the FSK modulated signal for substantially equalizing the phase distortion introduced by the frequency dependent resonant circuit.

In an additional embodiment of the hearing aid according to the second aspect of the invention, the controller monitors a data rate of the data stream and selects a frequency deviation for the FSK modulator according to the data rate of said data stream. The hearing aid is hereby able to handle data streams at a first and a second data rate, where the second data rate is twice as high as the first data rate, and wherein the frequency deviation for the FSK modulator is twice as high for the second data rate as for the first data rate. The phase compensation is then only applied for the highest frequency deviation.

According to a third aspect of the invention, there is provided a method of operating a frequency-shift-keying (FSK) transceiver having a resonant circuit comprising a transceiver inductance ($L_1$). The resonant circuit has a resonance frequency, $F_R$, and a transfer function where gain and phase are frequency dependent. The method includes the steps of applying a data stream to an FSK modulator, which in response thereto outputs an FSK modulated signal to the resonant circuit for wireless transmission; monitoring the data stream applied to the FSK modulator for detecting subsequent data values; and applying a predetermined phase shift to the FSK modulated signal for substantially equalizing the phase distortion introduced by the frequency dependent resonant circuit.

BRIEF DESCRIPTION OF THE DRAWINGS

The invention will be described in further detail with reference to preferred embodiments and the accompanying drawing, in which.

DETAILED DESCRIPTION OF THE INVENTION

Figure 1:
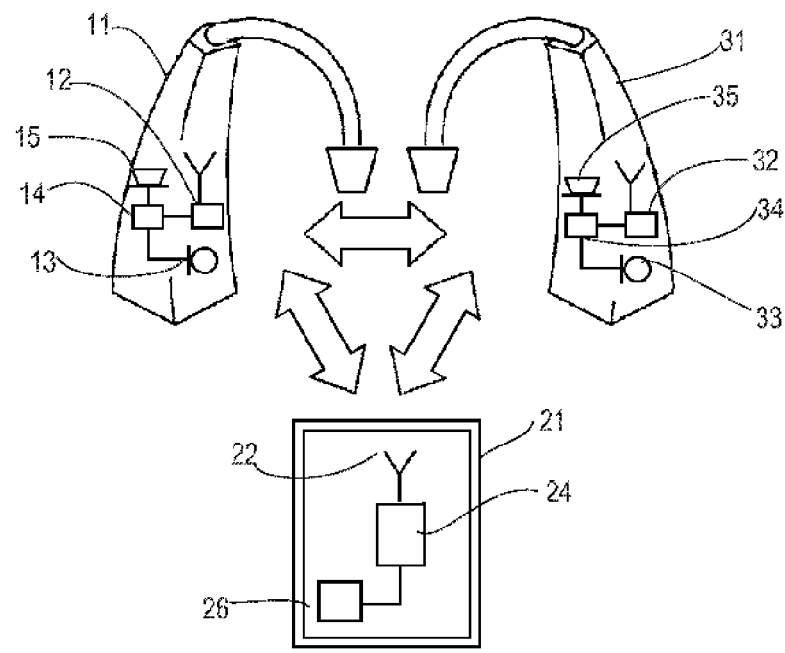
FIG. 1 illustrates schematically an hearing aid system employing a first embodiment of an FSK transmitter according to the invention.

A first embodiment of the invention will be described with reference to FIG. 1, in which is shown two hearings aids 11, 31 and an external device 21. According to the first embodiment, the two hearing aids 11, 31 define a pair of binaural hearing aids providing a more natural hearing for a hearing impaired user. The external device 21 may include one of following: a remote control communicating with the pair of binaural hearing aids 11, 31; an assistive listening device streaming audio from the TV, a remote external microphone, a mobile phone or another audio source for the pair of binaural hearing aids 11, 31; or a smartphone acting as a remote control and/or an assistive listening device which by means of dedicated application software controls the hardware of the smartphone.

The binaural hearing aids 11, 31 each include a microphone 13, 33 for picking up acoustical signals (ambient sound) from the surroundings of the hearing aid user and for converting the acoustic signals into electrical signals. The electrical signals from the microphone 13, 33 are applied to a signal processing unit 14, 34 in which the electrical signals representing sound are processed and amplified according to a prescription aimed at alleviating a hearing loss for a hearing impaired individual. The processed and amplified electrical signals are subsequently fed to an electrical-to-mechanical converter unit/speaker 15, 35 for converting the processed and amplified electrical signals into mechanical/audio signals perceivable by the hearing aid user.

According to the first embodiment of the invention, each of the binaural hearing aids 11, 31 includes a respective frequency-shift-keying (FSK) transceiver 12, 32 for enabling exchange of data between the binaural hearing aids 11, 31. The signal processing unit 14, 34 also processes the signals received by or transmitted by the transceiver 12, 32. Similar to this the external device 21—here embodied as a smartphone—includes a respective frequency-shift-keying (FSK) transceiver 22 for enabling exchange of data between the binaural hearing aids 11, 31. The external device 21 has a Central Processing Unit 24 retrieving data from a sound source—here a memory 26 containing music stored in an appropriate audio file format.

Figure 2:
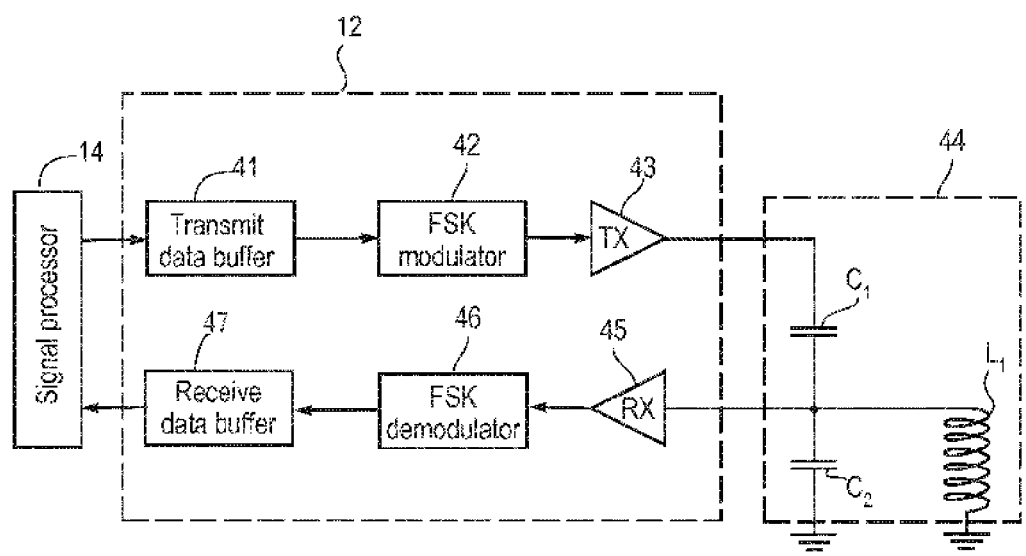
FIG. 2 illustrates schematically a first embodiment of an FSK transmitter according to the invention.

FIG. 2 shows the transceiver 12 of the binaural hearing aid 11 shown in FIG. 1. The signal processing unit 14 streams data for transmission to the transceiver 12, which receives these data in a transmit buffer 41. These data are then clocked out from the transmit buffer 41 as a digital bit stream with a bit rate, $R_b$. The bit rate is $R_b=1/T_b$, ($T_b$ for Binary Frequency Shift Keying is the bit period or the duration of one bit) and the data may be transmitted wirelessly by subjecting the bit stream to an FSK modulation and then modulating the FSK modulated bit stream onto a carrier wave at a carrier frequency $f_c$.

The digital bit stream from the transmit buffer 41 is fed to an FSK modulator 42 thereby generating a Binary Frequency Shift Keying (BFSK or 2FSK) signal for transmission comprising two distinct frequencies (tones), $f_1$ and $f_2$. These two distinct frequencies have the relationship: $f_1=f_c-\Delta f$, and $f_2=f_c+\Delta f$, where $\Delta f$ is the frequency deviation from $f_c$, and $2\Delta f=f_2-f_1$ which is called the frequency spacing. The frequency spacing (in Hz) is typically twice the symbol period, and the frequency spacing will therefore correspond to the bit rate (in bit per second) of a Binary Frequency Shift Keying system.

The FSK signal from the FSK modulator 42 is amplified in a TX power amplifier 43 and emitted as an RF signal from a coil $L_1$ in a resonant circuit 44. The resonant circuit 44 furthermore includes two capacitors $C_1$ and $C_2$ used for tuning the resonance frequency of the resonant circuit 44. The resonant circuit 44 acts as a band-pass filter having a frequency dependent transfer function which is seen in FIG. 3a and FIG. 3b.

In addition to the transmission of the RF signal, the resonant circuit 44 also picks up RF signals at the resonance frequency. The RF signals picked up are amplified in an RX power amplifier 45, and demodulated in an FSK demodulator 46 in which the original signal is recovered by detecting the frequencies involved in the original FSK modulation. This may be done by using a band-pass amplifier (not shown) tuned to one of the two frequencies, followed by a phase demodulator (not shown). The output from the FSK demodulator 46 is a digital bit stream led to the signal processing unit 14 via a receive buffer 47.

As an example for the first embodiment, the carrier frequency, $f_c$, of the FSK transceiver 12 is selected to be approximately 12.00 MHz with frequency spacing between the two signaling tones at 150 kHz. The technology applied may be regarded as short-range magnetic coupling; the range of the emitted RF signal is short compared to the wavelength of the signal.

Figure 3A:
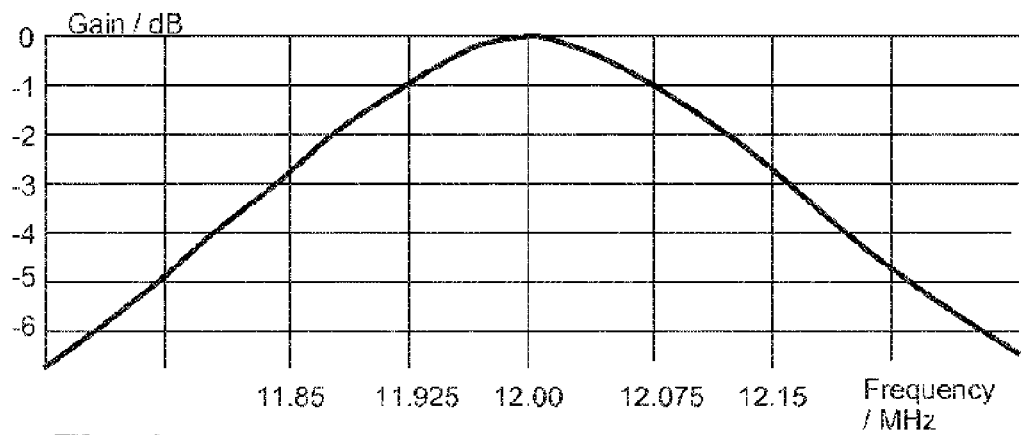
FIGS. 3a and 3b illustrate the frequency dependent transfer function—gain and phase, Respectively—for the resonant circuit employed by an FSK transmitter according to the invention.
Figure 3B:
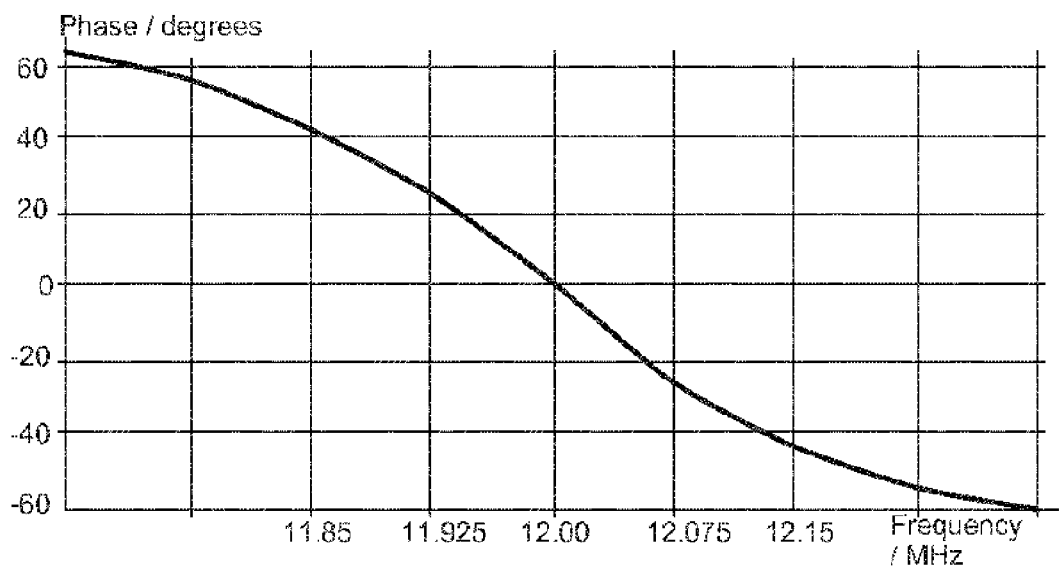

Referring to the frequency dependent transfer function for the resonant circuit 44 illustrated in FIG. 3a and FIG. 3b, it is seen that the maximum gain determined by the quality factor or the Q factor of the resonant circuit 44 is present at 12.00 MHz, and that that the gain decreases with almost 1 dB if changing the frequency up or down with 75 kHz, and with almost 3 dB if changing the frequency up or down with 150 kHz. It is also seen that compared to the center frequency, a change in the frequency in the order 75 kHz will cause a phase distortion in the level of 25 degrees, while a change in the frequency in the order 150 kHz will cause a phase distortion in the level of 45 degrees.

The resonant circuit 44 is in the first embodiment designed to operate at a resonance frequency, $f_c$, at 12.00 MHz with a frequency deviation, $\Delta f$, at 150 kHz. If desiring to increase the bit rate, $R_b$, to e.g. 300 kbit per second, this requires a frequency deviation, $\Delta f$, at 300 kHz. When sending an FSK signal with instantaneous frequency shifts from 11.85 MHz to 12.15 MHz, the resonance circuit phase shift changes between approximately +45 degrees and approximately −45 degrees. The exact phase shift is mainly a function of the current Q.

Figure 4:
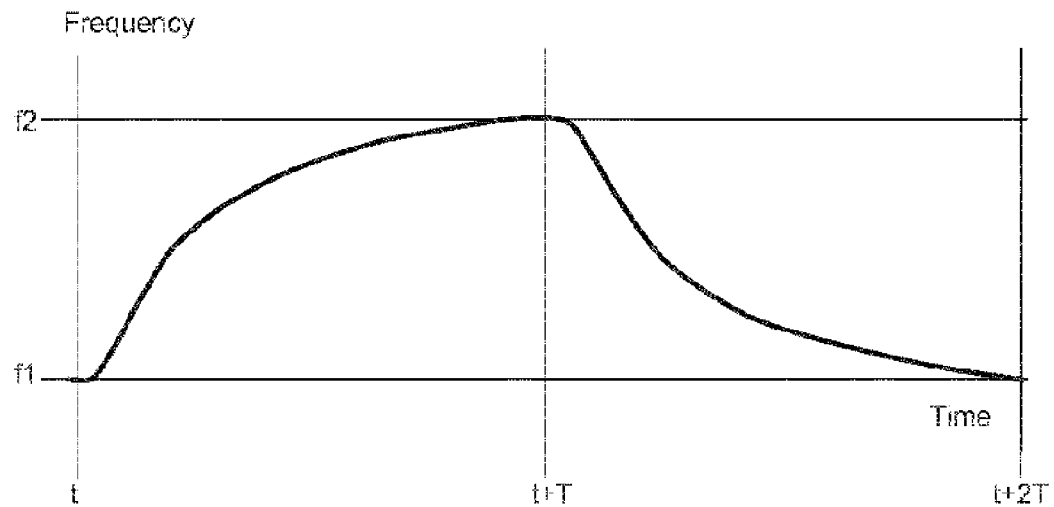
FIG. 4 illustrates the instantaneous frequency of an FSK signal emitted from the resonant circuit.

FIG. 4 illustrates the frequency of the FSK signal emitted from the coil, $L_1$, as a function of time when transmitting a bit rate of 300 kbit per second through a resonant circuit designed for half of that bit rate. When the FSK signal changed from $f_1$ (11.85 MHz) to $f_2$ (12.15 MHz) at t=0.0 μs and from $f_2$ (12.15 MHz) to $f_1$ (11.85 MHz) after the duration, T, of one data bit at t=3.3 μs, we will due to bandwidth limitation observe two undesirable effects.

The first undesired effect is that there will be variations in the amplitude of the transmitted signal, implying that the amplitude has to be adjusted down so as not to exceed the maximum permissible amplitude for the transmitter.

The second undesired effect is that the transmitter has an inherent inertia against changing the frequency instantaneously. Instead of switching frequency instantaneously, the inherent system inertia of the resonant circuit causes the frequency to sweep slowly towards the target frequency, and as seen from FIG. 4, the frequency is just able to reach the target frequency towards the end of the 3.3 μs period corresponding to the time between frequency shifts at a bit rate of 300 kbit per second.

The resonant circuit 44 works fine as long as the transmitted signal is included in a narrow frequency range having a phase error in the range +/−25 degrees compared to the resonance frequency of the circuit. When trying to operate at frequencies beyond this frequency range, the inherent inertia against changing the frequency momentarily will cause the frequency to sweep between two tones instead of substantially toggle between the tone. This makes it difficult to detect the transmitted signal, which will affect the signal to noise ratio and reduce the operation range of the entire system.

Figure 5:
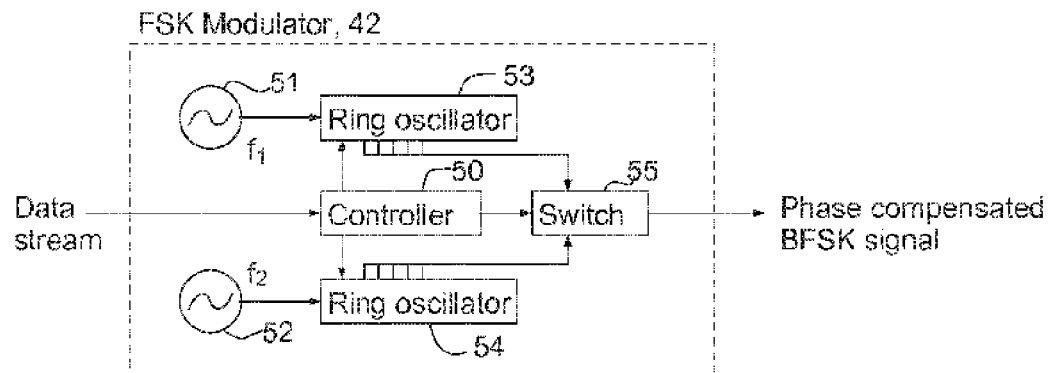
FIG. 5 illustrates schematically a first embodiment of an FSK modulator used in a transceiver according to the invention.

FIG. 5 illustrates schematically a first embodiment of an FSK modulator 42 used in a transceiver according to the invention. The data stream is received by a controller 50 from the transmit buffer 41 (FIG. 2). Two oscillators 51 and 52 deliver the two modulation frequencies, $f_1$=11.85 MHz and $f_2$=12.15 MHz, to respective ring oscillators 53 and 54. The ring oscillator 53, 54 may be composed of an odd number of inverters to provide the effect of a single inverting amplifier with a gain greater than one. Rather than having a single delay element, each inverter contributes to the delay of the signal around the ring of inverters. The oscillator period is equal to twice the sum of the individual gate delays of the inverter stages. The output of every inverter in a ring oscillator changes a finite amount of time after the input has changed.

By providing the individual inverter outputs with taps, the controller 50 is able to select an appropriate inverter output tap for introducing an appropriate time delay and thereby an appropriate phase shift. Hereby, the output from the two oscillators 51 and 52 may be compensated by appropriate phase shifts in order to compensate for the phase distortion in the resonant circuit 44. The controller 50 furthermore controls a switch 55, in order to ensure that the appropriate, compensated tone signal from the two oscillators 51 and 52 is delivered as phase compensated BFSK signal to the resonant circuit 44.

By shifting the phase, the FSK modulator 42 will be able to double the bitrate sent via the resonant circuit 44 without facing the two undesirable effects mentioned above.

For a standard FSK signal the phase varies continuously, as the modulated waveform switches instantaneously between two sinusoids at two distinct frequencies (tones), $f_1$ and $f_2$, and for BFSK systems, it is known that the phase changes by +/−π during one symbol ($T_b$ seconds). −π for the logic symbol "1" and +π for logic symbol "0".

Figure 6:
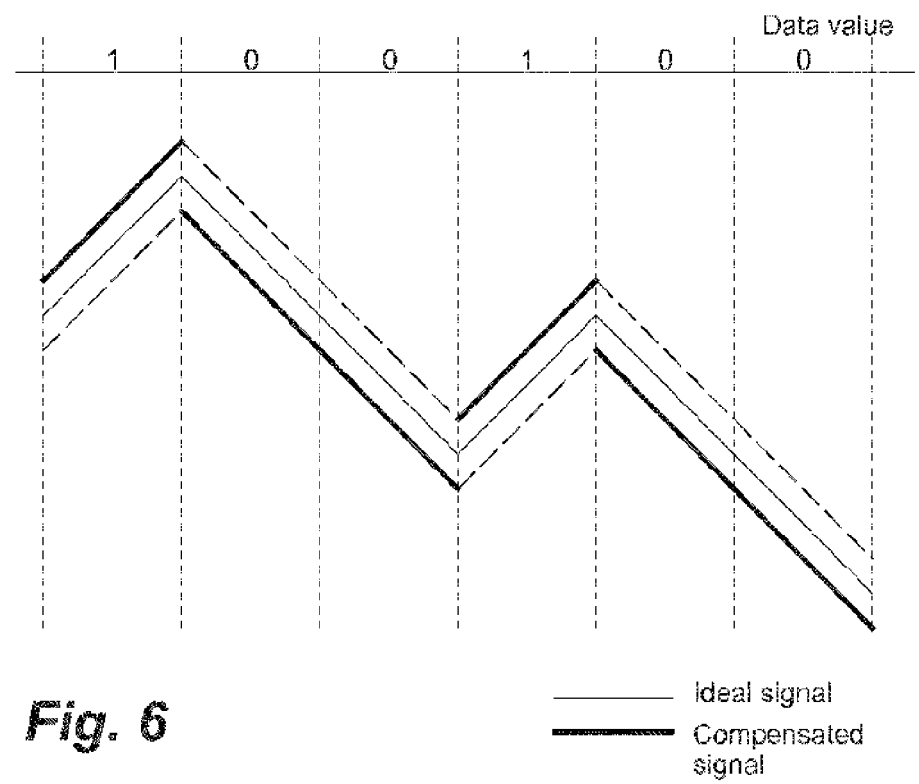
FIG. 6 illustrates the phase trellis for a data sequence from the FSK modulator—both the ideal and the compensated phase.

We can therefore draw the phase trellis for the BFSK modulation, and in FIG. 6 the phase trellis is shown for the data sequence: "1-0-0-1-0-0" as a function of time. The thin solid line represents the phase trellis for an ideal system without the distorting effects of the resonant circuit 44. The thick solid line represents the compensated phase trellis for a compensating system compensating for the distorting effects of the resonant circuit 44. In order to compensate for the approx. +/−45 degrees phase distortion, the introduced phase shift has to reduce the total phase distortion substantially, and bring it close to 0 degrees, or at least within +/−25 degrees as if the resonant circuit did match the bit rate. In the first embodiment the phase shift, when switching from "1" to "0", is approx. −90 degrees, and +90 degrees when switching from "0" to "1". In other words the compensated FSK signal will have a phase bringing the compensated signal 45 degrees ahead of the ideal signal for a "0", and 45 degrees behind for a "1".

It is noted how the phase shifting applied to the tone signal from the oscillators 51 and 52, so the phase shift corresponds to the frequency dependent phase shift in the resonance circuit 44, will compensate for the un-ideal properties of the resonance circuit 44. As the applied phase shift changes when switching frequency, this will result in a phase discontinuity.

Figure 7:
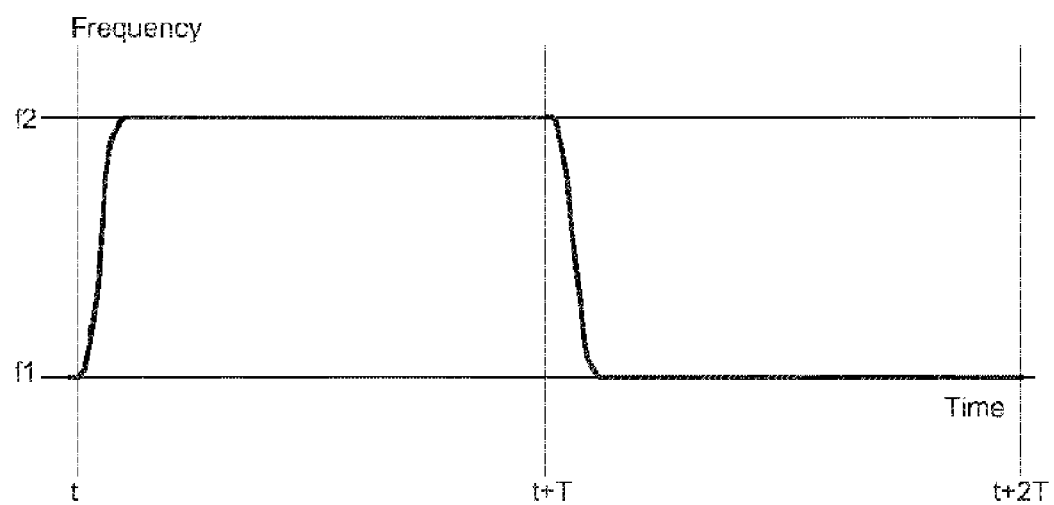
FIG. 7 illustrates the frequency behavior of a compensated FSK signal emitted from the resonant circuit.

FIG. 7 shows the transmitted signal after compensation, and it is seen that frequency changes substantially instantaneously, which makes it easier for the receiver to distinguish between a transmitted "1" and "0". In addition to this, the signal amplitude of the sinusoid signal will also remain constant, which means that it will be possible to increase the transmission power without damaging the transmitter.

Figure 9:
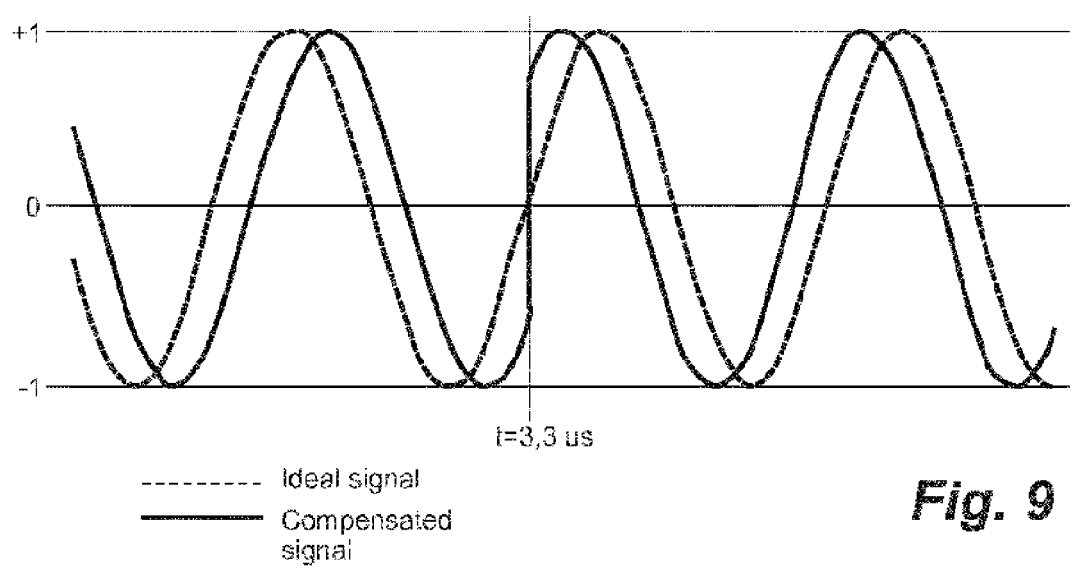
FIG. 9 illustrates the time domain representation of the signal from the FSK modulator —both the ideal signal and the compensated signal.

With reference to FIG. 9, the FSK modulated signal from the FSK modulator 42 is shown for the transition from a modulated "1" to a modulated "0". The ideal signal is shown in dotted line and the compensated signal is shown in bold. There is zoomed in around t=3.3 μs, where frequency changes from $f_1$ to $f_2$.

The dotted graph illustrates the ideal FSK signal without phase discontinuities. The bold line graph shows the phase compensated signal. Prior to t=3.3 μs, the frequency $f_1$ is 11.85 MHz, and the phase is delayed 45 degrees to compensate for the resonance circuit phase shift. After t=3.3 μs, the frequency has changed to $f_2$=12.15 MHz, and the controller 50 has forced the phase to shift 45 degrees ahead relative to the ideal signal; this corresponds to an instant phase shift of 90 degrees at t=3.3 μs.

Tests and simulations have shown that the signal to noise ratio (SNR) in the receiver improved about 3 dB for a system with a bit rate of 300 kbit per second, Q=40, for a resonant frequency $f_R$=12.00 MHz and an deviation frequency Δf=150 kHz. This corresponds to an improvement of the range of approximately 10%.

Figure 8:
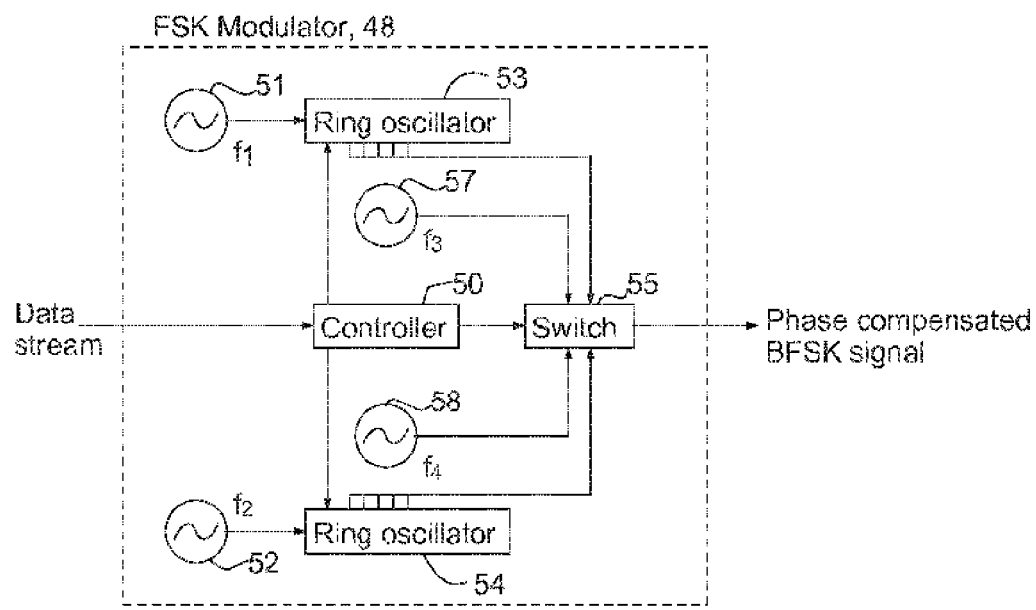
FIG. 8 illustrates schematically a second embodiment of a FSK modulator used in a transceiver according to the invention.

With reference to FIG. 8, a second embodiment of an FSK modulator 48 is used in a transceiver according to the invention. The data stream to be modulated is received by the controller 50 from the transmit buffer 41 (FIG. 2). Four oscillators 51, 52, 57 and 58 deliver two set of modulation frequencies, $f_1$-$f_4$. The first set of modulation frequencies, $f_1$=11.85 MHz and $f_2$=12.15 MHz, is delivered to respective ring oscillators, 53 and 54, phase shifting the tone signal supplied to the switch 55 as discussed with reference to the first embodiment shown in FIG. 5. The second set of modulation frequencies, $f_3$=11.925 MHz and $f_4$=12.075 MHz, is delivered directly to the switch 55.

According to the second embodiment, the controller 50 will be able to handle data at two bitrates—with a deviation frequency Δf=75 kHz and Δf=150 kHz, respectively. As long as the maximum bitrate is below 150 kbit per second, the controller will modulate the data signal employing the oscillators 57 and 58 with the narrow deviation frequency, and the modulated signal does not have to be phase compensated. For higher bitrate need, the controller detects the needs from a data header, and modulates the data signal by employing the oscillators 51 and 52 with the wide deviation frequency. The output from the two oscillators 51 and 52 are shifted in phase in order to compensate for the phase distortion in the resonant circuit 44.

The invention has above been described with reference to a Binary FSK system, but could be applied in an M-ary FSK system as well.

I claim:

1. A frequency-shift-keying (FSK) transceiver for use in a hearing aid system and having a resonant circuit comprising a transceiver inductance (L1), said resonant circuit having a resonance frequency $F_R$, and a transfer function where gain and phase are frequency dependent, wherein the transceiver comprises:
   an FSK modulator receiving a data stream, and in response thereto outputting an FSK modulated signal to the resonant circuit for wireless transmission, said FSK modulated signal characterized by repeated frequency shifts;
   a controller monitoring the data stream received by the FSK modulator; and
   a phase equalizer unit controlled by the controller for applying a phase correction to the FSK modulated signal at each frequency shift, for substantially equalizing phase distortion introduced by the frequency dependent resonant circuit.

2. The FSK transceiver according to claim 1, wherein the phase equalizer unit includes a ring oscillator having a plurality of output taps, and the controller is adapted for selecting the output tap providing the equalization appropriate for substantially equalizing said phase distortion.

3. The FSK transceiver according to claim 1, wherein each frequency shift corresponds to a change of data value in said data steam, and the phase equalizer unit applies an updated phase correction in response to a change of said data value.

4. The FSK transceiver according to claim 1, wherein the controller is adapted for monitoring a data rate of said data stream and selecting a frequency deviation for FSK modulator according to the data rate of said data stream.

5. The FSK transceiver according to claim 4, adapted for handling data streams at a first and a second data rate, wherein the second data rate is twice as high as the first data rate, and wherein the frequency deviation for the FSK modulator is twice as high for the second data rate as for the first data rate.

6. A hearing aid with a frequency-shift-keying (FSK) transceiver having a resonant circuit comprising a transceiver inductance ($L_1$), said resonant circuit having a resonance frequency $F_R$, and a transfer function where gain and phase are frequency dependent, wherein the transceiver comprises:
   an FSK modulator receiving a data stream, and in response thereto outputting an FSK modulated signal to the resonant circuit for wireless transmission, said FSK modulated signal characterized by repeated frequency shifts;
   a controller monitoring the data stream received by the FSK modulator; and
   a phase equalizer unit controlled by the controller for applying a phase correction to the FSK modulated signal at each frequency shift, for substantially equalizing phase distortion introduced by the frequency dependent resonant circuit.

7. The hearing aid according to claim 6, wherein the phase equalizer unit includes a ring oscillator having a plurality of output taps, and the controller is adapted for selecting the output tap providing the equalization appropriate for substantially equalizing said phase distortion.

8. The hearing aid according to claim 6, wherein each frequency shift corresponds to a change of data value in said data stream, and the phase equalizer unit applies an updated phase correction in response to a change of said data value.

9. The hearing aid according to claim 6, wherein the controller is adapted for monitoring a data rate of said data stream and selecting a frequency deviation for FSK modulator according to the data rate of said data stream.

10. The hearing aid according to claim 9, adapted handling data streams at a first and a second data rate, wherein the second data rate is twice as high as the first data rate, and wherein the frequency deviation for the FSK modulator is twice as high for the second data rate as for the first data rate.

11. A method of operating a frequency-shift-keying (FSK) transceiver having a resonant circuit comprising a transceiver inductance ($L_1$), said resonant circuit having a resonance frequency $F_R$, and a transfer function where gain and phase are frequency dependent, said method including:
    applying a data stream to an FSK modulator, which in response thereto outputs an FSK modulated signal to the resonant circuit for wireless transmission, said FSK modulated signal characterized by repeated frequency shifts;
    monitoring the data stream applied to the FSK modulator for detecting subsequent data values; and
    applying a predetermined phase shift to the FSK modulated signal at each frequency shift for substantially equalizing phase distortion introduced by the frequency dependent resonant circuit.

12. The method according to claim 11, wherein the FSK modulator includes a signal source includes a ring oscillator having a plurality of output taps, and wherein said method includes selecting an output tap of a ring oscillator for providing phase compensation appropriate for substantially equalizing said phase distortion.

13. The method according to claim 11, wherein each frequency shift corresponds to a change of data value in said data stream, and said method includes applying an updated phase correction in response to a change of said data value.

14. The method according to claim 11, wherein said method includes:
    monitoring a data rate of said data stream; and
    selecting a frequency deviation for FSK modulator according to the data rate of said data stream.

15. The method according to claim 14, wherein said method includes handling of data streams at a first and a second data rate, where the second data rate is twice as high as the first data rate, and where the frequency deviation for the FSK modulator is twice as high for the second data rate as for the first data rate, wherein the applying a predetermined phase shift to the FSK modulated signal for substantially equalizing the phase distortion is introduced for the second data rate only.

* * * * *